United States Patent
Nardi

[19]
[11] Patent Number: 5,977,912
[45] Date of Patent: Nov. 2, 1999

[54] APPARATUS AND METHOD FOR EMITTER LOCATION

[75] Inventor: Benedict J. Nardi, Thurmont, Md.

[73] Assignee: Watkins-Johnson Company, Palo Alto, Calif.

[21] Appl. No.: 09/090,302

[22] Filed: Jun. 3, 1998

[51] Int. Cl.[6] ...................................................... G01S 3/02

[52] U.S. Cl. ......................... 342/457; 342/463; 342/450; 342/126

[58] Field of Search ..................................... 342/463, 464, 342/465, 450, 457, 126

[56] References Cited

U.S. PATENT DOCUMENTS 5,661,492   8/1997   Shoap et al. .......................... 342/465

Primary Examiner—Theodore M. Blum
Attorney, Agent, or Firm—Flehr Hohbach Test Albritton & Herbert LLP

[57] ABSTRACT

An emitter locator for locating an emitter transmitting an emitter signal includes a plurality of scatters and a base station. The plurality of scatterers are located at predetermined positions, where each scatterer includes a modulator configured to modulate an electrical signal on an antenna and configured to receive emitter signal and to modulate the emitter signal to generate a scattered signal. The base station is configured to receive a composite signal containing the emitter signal and a plurality of the scattered signals, where the base station includes a processor configured to separate the scattered signals from the composite signal and to identify relative power levels of the scattered signals to determine a location of the emitter. Advantages of the invention include the ability to locate emitters in an efficient and cost effective manner by using scatterers and a base station.

8 Claims, 4 Drawing Sheets

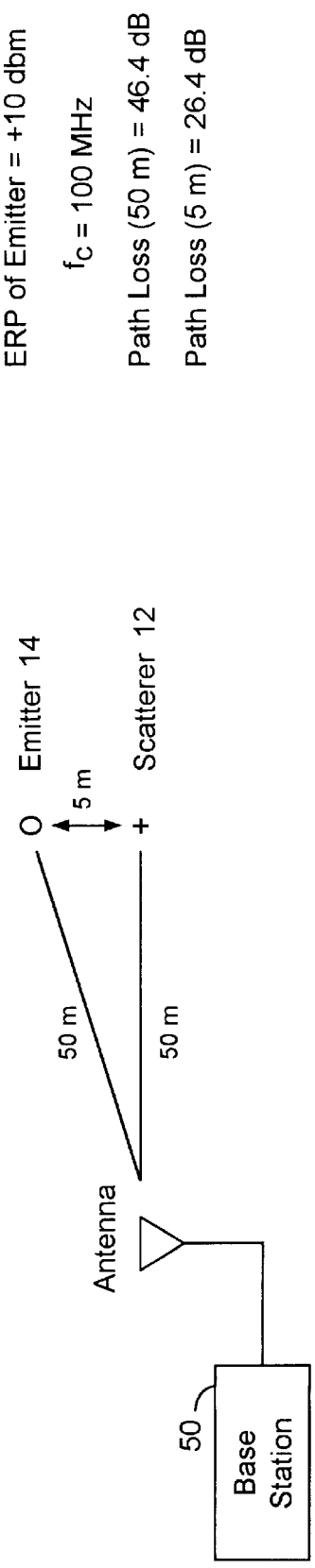

Simplified Example of Operation

ERP of Emitter = +10 dbm $f_C$ = 100 MHz

Path Loss (50 m) = 46.4 dB

Path Loss (5 m) = 26.4 dB

Emitter ⟶ Base station

ERP = +10
Path Loss = (-)46.4 dB
Ant. Gain = 0
─────────────
-36.4 dBm

Emitter ⟶ Scatterer

ERP = +10
Path Loss = (-)26.4 dB
Ant. Gain = -10 dBi
─────────────
-26.4 dBm

Reradiated from scatterer ⟶ Base station

Received = -26.4 dBm
Conv. Loss = (-)12.0 dB
Ant. Gain = -10.0
Path Loss = (-)46.4 dB
Ant. Gain = 0
─────────────
-94.8 dBm IF Processing Bandwidth ~1 Hz, A-95 dBm signal should be recoverable

FIG. 4

APPARATUS AND METHOD FOR EMITTER LOCATION

FIELD

The present invention relates to an apparatus and method for emitter location. In particular, the invention includes a group of scatterers and a base station that can determine the location of an emitter.

BACKGROUND

Emitters that transmit radio frequency (RF) electromagnetic radiation can take the form of many known devices. For example, mobile telephones, 2-way radios, surveillance electronics and RF tags all transmit RF electromagnetic radiation to communicate with a receiver.

Locating emitters is important for safety, emergency, security and inventory control reasons. For example, if a criminal is using a mobile telephone, pinpointing his location will assist the police in capturing him. In an emergency, locating a person transmitting a signal is important for rescuing him. For security, locating and eliminating surveillance electronics will insure that confidential discussions remain confidential. RF tags can be used for inventory control or locating products in a large warehouse that are have such tags attached to them.

One known technique for locating an emitter employs a directional antenna to identify the direction of the emitter source. Limitations to this technique are that the directional antenna must be physically moved about to identify the direction of the emitter source, multipath and large path loss variation can cause erroneous readings and no information is provided regarding the range to the unknown source.

Another known technique for locating an emitter employs a plurality of base stations. Each base station receives the emitter signal and measures the direction of arrival (DOA). The emitter location is then determined by triangulation based on the DOA. While this technique is fairly accurate, it still suffers from multipath and large path loss variation and it requires a significant hardware deployment of many base stations.

A goal of the invention is to overcome the identified limitations and to provide an efficient and cost effective apparatus and method for emitter location.

SUMMARY

The invention provides an efficient and cost effective apparatus and method for emitter location. An exemplary embodiment of the invention includes a plurality of scatterers and a base station. The scatterers are located in predetermined positions in an area where an emitter may be located, for example on a campus or in a warehouse. Each of the scatterers includes a modulator configured to modulate a unique electrical signal on an antenna. When the emitter signal is received by each of the scatterers, each scatterer re-radiates the emitter signal with its own unique modulation as a scattered signal. The base station is configured to receive a composite signal containing the emitter signal and a plurality of the scattered signals. The base station also includes a processor configured to separate the scattered signals from the composite signal. The processor then evaluates the strength of the components to determine the distance of the emitter from each of the scatterers. Since the scatterer's positions are known, the processor can then accurately determine the emitter's location.

Advantages of the invention include the ability to locate RF emitters in an efficient and cost effective manner by using scatterers and a base station.

BRIEF DESCRIPTION OF THE FIGURES

Additional advantages of the invention will become apparent upon reading the following detailed description and upon reference to the drawings, in which:

FIG. 4 is an example of the power levels in an emitter location system according to an embodiment of the invention.

DETAILED DESCRIPTION

Exemplary embodiments are described with reference to specific configurations. Those skilled in the art will appreciate that various changes and modifications can be made while remaining within the scope of the claims.

Figure 1:
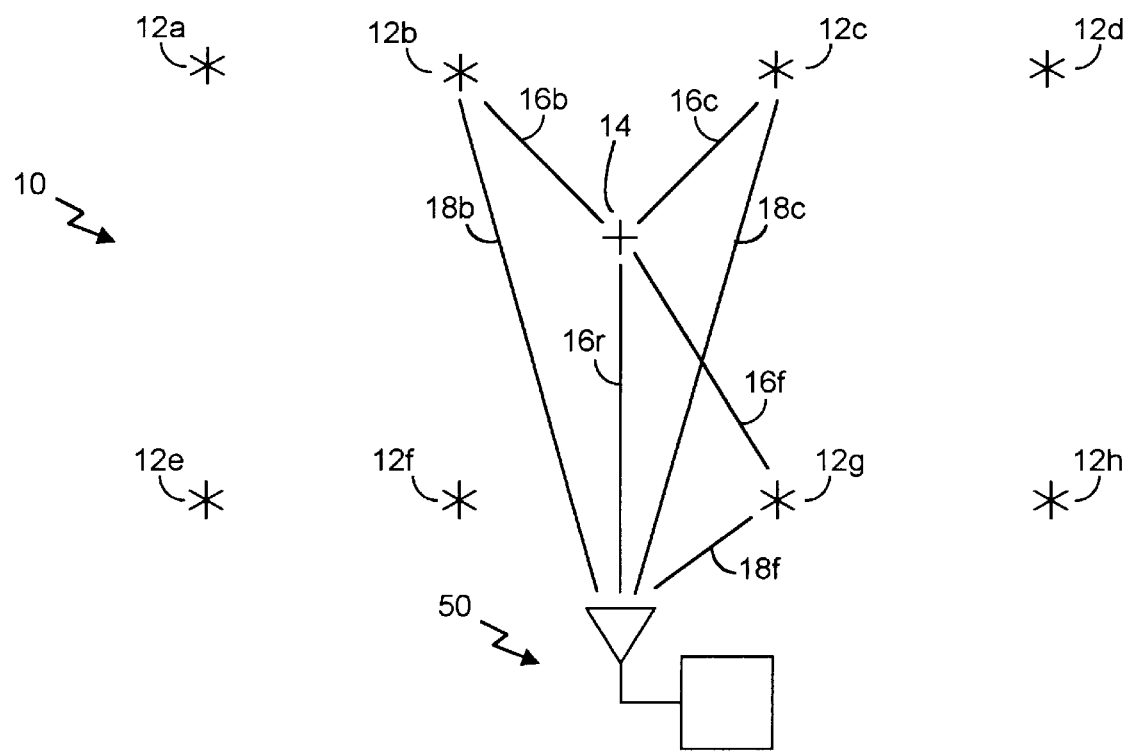
FIG. 1 depicts an apparatus for emitter location according to an embodiment of the invention.
Figure 2:
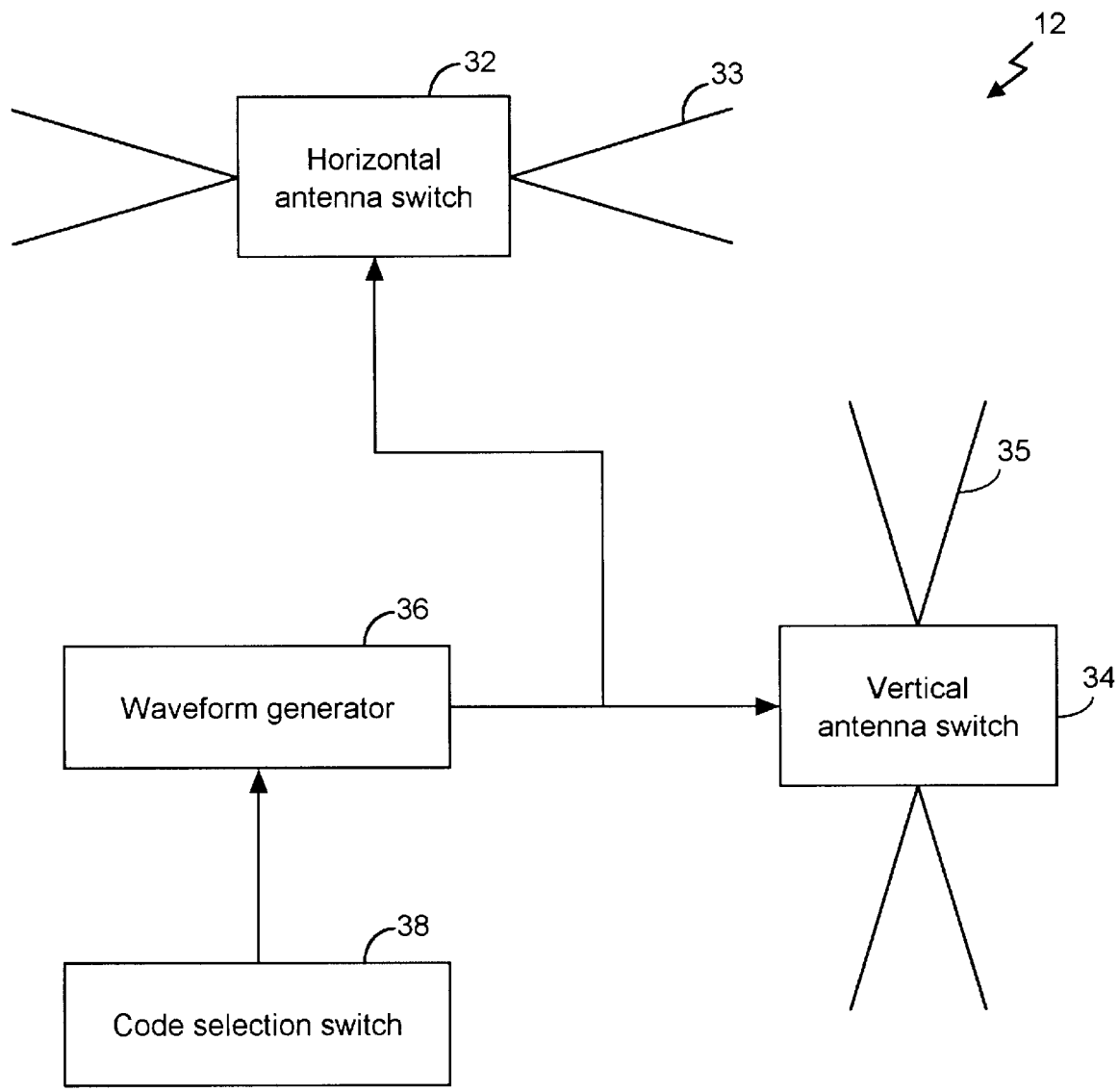
FIG. 2 is a block diagram of a scatterer according to an embodiment of the invention.

FIG. 1 depicts an apparatus for emitter location 10 according to an embodiment of the invention. An array of scatterers 12a–12h are deployed in a geometrical pattern. FIG. 2 is a block diagram of a scatterer 12 according to an embodiment of the invention. Each scatterer includes a horizontal antenna switch 32 coupled to a horizontal antenna 33 and a vertical antenna switch 34 coupled to a vertical antenna 35. A waveform generator 36 is coupled to the antennas 32 and 34 and is controlled by a code selection switch 38. The code selection switch supplies an oscillation code to the waveform generator in order to supply a predetermined signal to the antennas 32 and 34. For example, the waveform generator can be programmed to supply a 100 Hz sinusoidal signal to the antennas 32 and 34. Additionally, each of the scatterers 12a–12h can be programmed differently in order to each provide a unique signal to their respective antennas. For example, scatter 12b can be programmed to supply a 120 Hz signal to its antennas, scatterer 12c can be programmed to supply a 140 Hz signal to its antennas, and so on. The sinusoidal signals can be set to any frequency, but are preferably set in the range of 100 to 10,000 Hz. Alternately, each scatterer can be programmed with a unique square wave signal or pseudo-random noise (PN) signal. This type of unique programming is advantageous for generating unique scattered signals as explained below.

The position of each scatterer is known when the scatterers are deployed. For example, the scatterers can be deployed by a technician using a GPS position device to identify the position of each scatterer when it is deployed. Then the scatterer position information is input into the system 10 and the position information is stored for later use. Alternatively, for example, the scatterers can be positioned in a building such as a warehouse at known position and that information is input into the system 10 for later use.

An emitter 14 is located at an unknown position and emits a radio frequency. (RF) emitter signal. In the exemplary embodiment, the emitter is presumed to have an omnidirectional antenna so the strength of the emitter signal decreases relative to one over the distance cubed ($1/d^3$). The emitter signal is broadcast outward from the emitter and is received by each of the scatterers 12a–12h. For purposes of illustration, we concentrate on the emitter signal received by scatterers 12b, 12c and 12g. First, the emitter signal 16b travels from the emitter 14 to the scatterer 12b. At that point, the scatterer modulates the emitter signal with its particular strength and re-broadcasts the modulated emitter signal as scattered signal 18b. Second, the emitter signal 16c travels from the emitter 14 to the scatterer 12c. At that point, the scatterer modulates the emitter signal with its particular strength and re-broadcasts the modulated emitter signal as scattered signal 18c. Third, the emitter signal 16f travels from the emitter 14 to the scatterer 12g. At that point, the scatterer modulates the emitter signal with its particular strength and re-broadcasts the modulated emitter signal as scattered signal 18f.

A base station 50 receives a composite signal from the emitter and the scatterers including emitter signal 16r and scattered signals 18b, 18c and 18g. Of course, the receiver 50 also receives scattered signals from the other scatterers not specifically shown in FIG. 1. The strengths of the received signals are shown in Table 1.

TABLE 1

| Scatterer | Relative Power |
|---|---|
| 12a | 0.024 |
| 12b | 0.21 |
| 12c | 1.0 |
| 12d | 0.076 |
| 12e | 0.012 |
| 12f | 0.11 |
| 12g | 0.21 |
| 12h | 0.061 |

Figure 3:
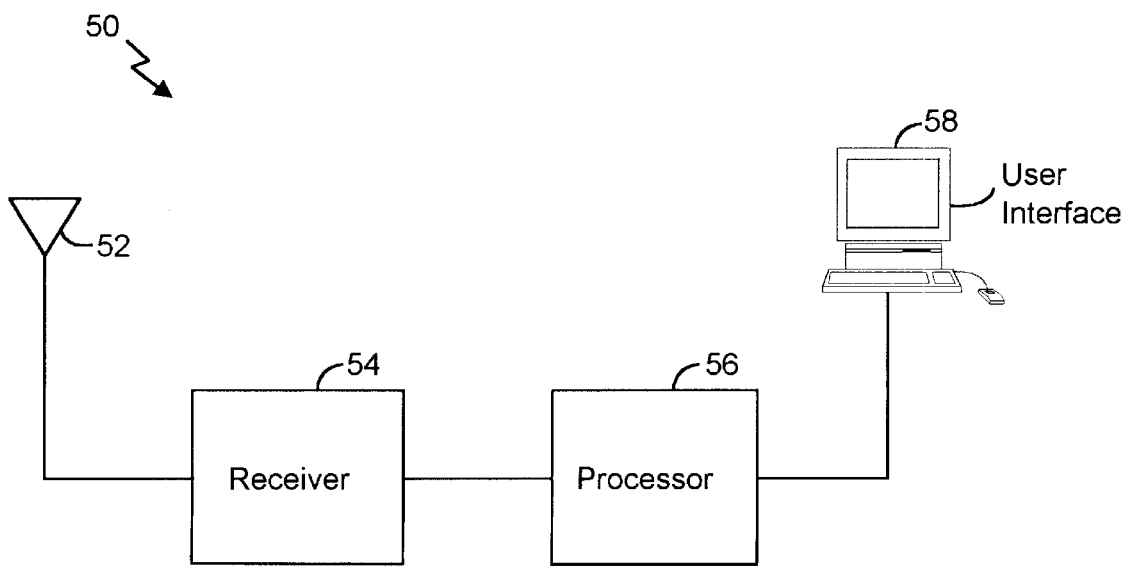
FIG. 3 is a block diagram of a base station according to an embodiment of the invention.

The composite signal includes the emitter signal 16r and the scattered signals, which appear as sideband signals. FIG. 3 is a block diagram of the base station 50 according to an embodiment of the invention. An antenna 52 is coupled to a receiver, which is coupled to a processor 56. A user interface 58 includes a terminal for a human to control the base station 50 and to receive results from the processor. Since the base station receives the composite signal at a predetermined frequency, the processor 56 controls the receiver 54 and can be tasked to scan available frequencies to search for an unknown type of emitter.

FIG. 4 is an example of the power levels in an emitter location system according to an embodiment of the invention. The example is based on an emitter 14 that has a radiated power of +10dBm, the distance between the emitter 14 and the base station 50 is 50 m, the distance between the emitter 14 and the scatterer 12 is 5 m and the distance between the scatterer 12 and the base station is 50 m. The emitter to base station path loss is 46.4 dBm so the emitter signal strength at the base station is −36.4 dBm. The emitter to scatterer path loss is 26.4 dBm so the emitter signal strength at the scatterer is −16.4 dBm, but with the antenna gain of −10 dBm, the emitter signal strength is −26.4 dBm. The scatter to base station path loss is 46.4 dBm so the signal strength of the scattered emitter signal at the base station is −94.8 dBm. In the exemplary embodiment, the intermediate frequency processing bandwidth is 1 kHz, which permits recovery of a signal as low as approximately −95 dBm. As a result, the emitter signal will be recovered as a sideband signal and, along with similar signal information from other scatterers, the emitter can then be located.

Figure 5:
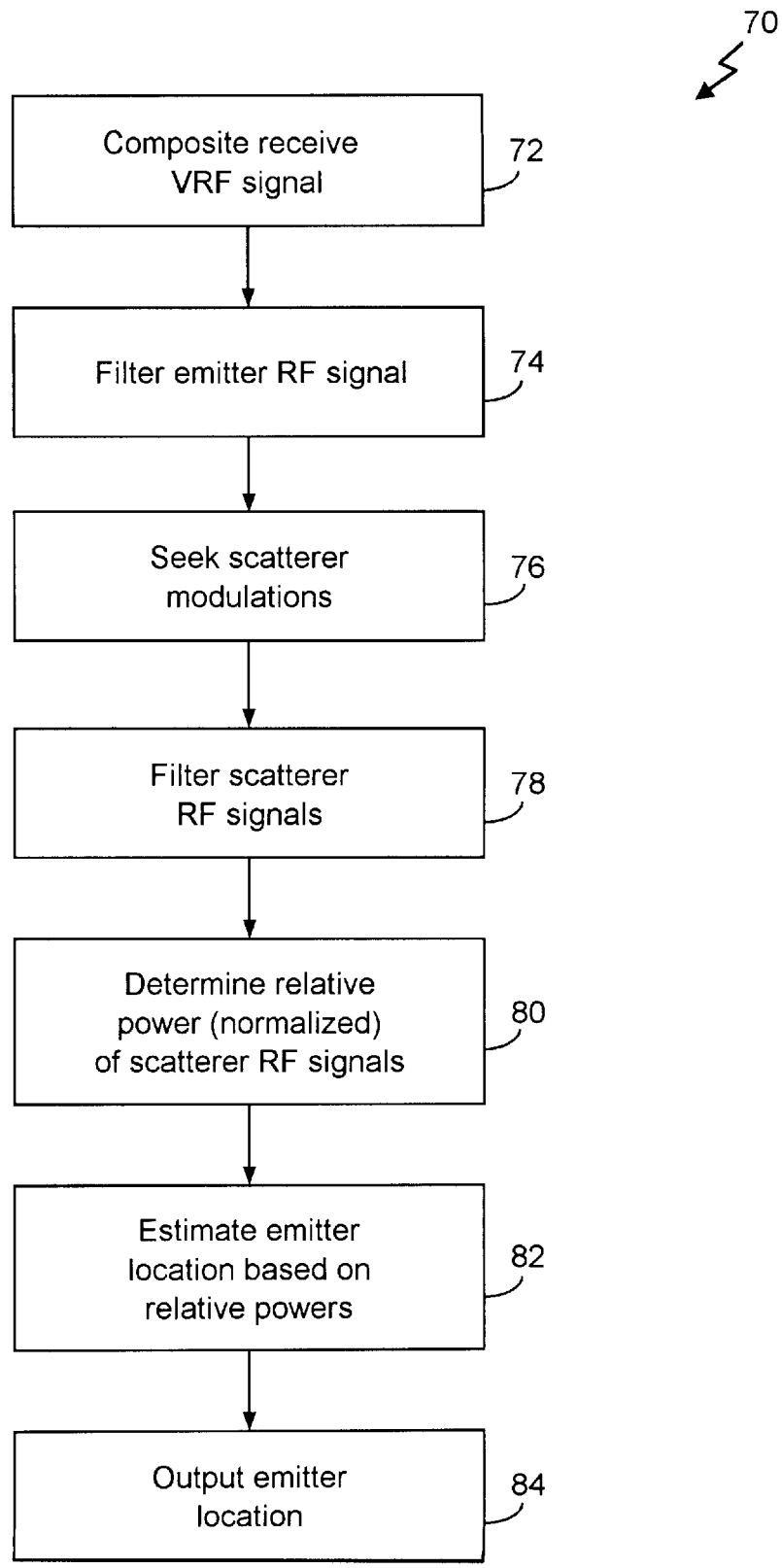
FIG. 5 is a flow chart for emitter location according to an embodiment of the invention.

FIG. 5 is a flowchart 70 that describes the functions performed by the base station 50. At step 72, the receiver 54 receives the composite signal and demodulates the signal from a radio frequency (RF) to an intermediate frequency (IF) and filters the signal, at step 74, to provide a baseband signal centered around the emitter signal frequency. At step 76, the processor 56 identifies the scattered signals, which appear as sidebands to the emitter signal. At step 78, the processor filters out each of the scattered signals to separate each scattered signal from the baseband signal. At step 80, the processor determines the relative, or normalized, power levels of each of the scattered signals. The processor essentially creates Table 1 (above) in the exemplary embodiment. In step 82, the processor uses the scatterer location information discussed above to estimate the emitter location. Specifically, the processor employs a triangulation algorithm based on the emitter signal radiated power (relative to $1/d^3$). In step 84, the processor provides the output of step 82 to the user interface 58 to inform the user of the estimated location of the emitter. At this point, the user knows the location of the emitter and can go to that location to find the emitter.

An alternate implementation of the base station employs a wideband receiver 54 that demodulates the composite signal to an IF signal and performs an analog to digital (A/D) conversion to generate a digital baseband signal. The processor 56 then performs digital signal processing algorithms to filter and identify the scattered signals. With this technique, the processor performs the filtering and can scan the frequencies by employing a digital filter algorithm, as known in the art. Then the processor can perform the location algorithm described above to provide a location estimate of the emitter.

CONCLUSION

Advantages of the invention include the ability to locate RF emitters in an efficient and cost effective manner by using scatterers and a base station.

Having disclosed exemplary embodiments and the best mode, modifications and variations may be made to the disclosed embodiments while remaining within the scope of the invention as defined by the following claims.

What is claimed is:

1. An apparatus for locating an emitter transmitting an emitter signal, comprising:

a plurality of scatterers located at predetermined positions, each scatterer including a modulator having a unique modulation signal and configured to modulate an electrical signal on an antenna and configured to receive said emitter signal and modulate said emitter signal to generate and radiate a unique scattered signal; and a base station including an antenna coupled to a receiver and configured to receive a composite signal containing said emitter signal and a plurality of said unique scattered signals, said base station further including a processor coupled to said receiver and configured to separate said unique scattered signals from said composite signal and to identify relative power levels of said unique scattered signals to determine a location of said emitter based at least in part on said relative power levels.

2. The apparatus of claim 1, wherein said scatterer further comprises:

an antenna coupled to an antenna switch and configured to generate said unique modulation signal from an electrical signal received on said antenna; and a waveform generator coupled to said antenna and configured to supply said unique modulation signal to said antenna based on a predetermined oscillation code supplied by a code selection switch.

3. The apparatus of claim 1, wherein:

said processor is configured to separate said emitter signal from said composite signal.

4. The apparatus of claim 1, wherein:

said processor is configured to determine said location of said emitter by triangulation.

5. A method of locating an emitter transmitting an emitter signal using a plurality of scatterers each having a unique modulation signal located at predetermined positions and a base station, comprising the steps of:

receiving the emitter signal at each of the scatterers;

modulating the emitter signal at each of the scatterers with said unique modulation signal of the respective scatterer;

generating and radiating a plurality of unique scattered signals, where each scatterer generates a unique scattered signal;

receiving a composite signal containing the emitter signal and the plurality of unique scattered signals at the base station;

separating the unique scattered signals from the composite signal;

processing the unique scattered signals to identify relative power levels of the unique scattered signals; and determining a location of the emitter based at least in part on the relative power levels.

6. The method of claim 5, further including the step of:

programming each scatterer of said plurality of scatterer to produce said unique modulation signal.

7. The method of claim 5, wherein:

said processing step includes the step of separating the emitter signal from the composite signal.

8. The method of claim 5, wherein:

said determining step includes to the step of determining the location of the emitter by triangulation.

* * * * *